April 25, 1967
B. GREENWOOD
3,315,924
ASSEMBLY FOR MOUNTING ELECTRICAL FITTINGS IN
NEW WALL AND CEILING CONSTRUCTION
Filed June 1, 1965
4 Sheets-Sheet 1
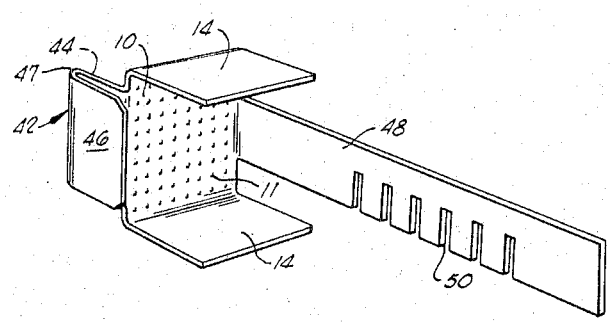
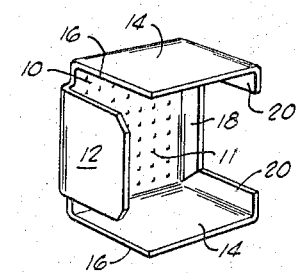
Fig. 4         Fig. 1
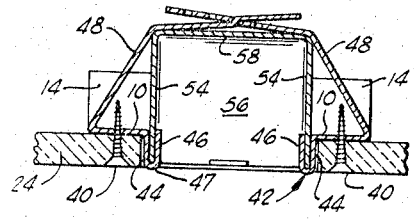
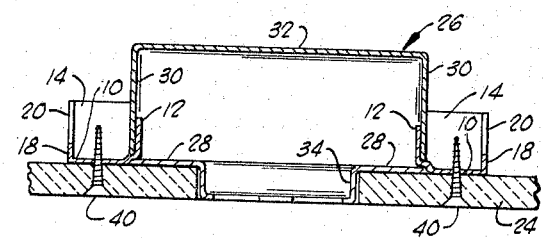
Fig. 6         Fig. 3
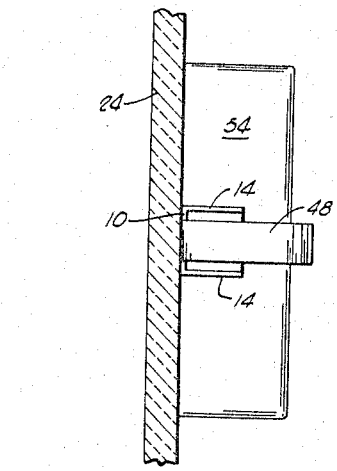
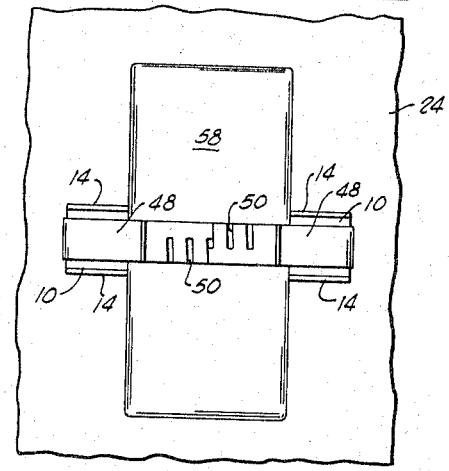
Fig. 7         Fig. 8
INVENTOR.
BEVERLY GREENWOOD
BY
*Dunlap & Laney*
ATTORNEYS

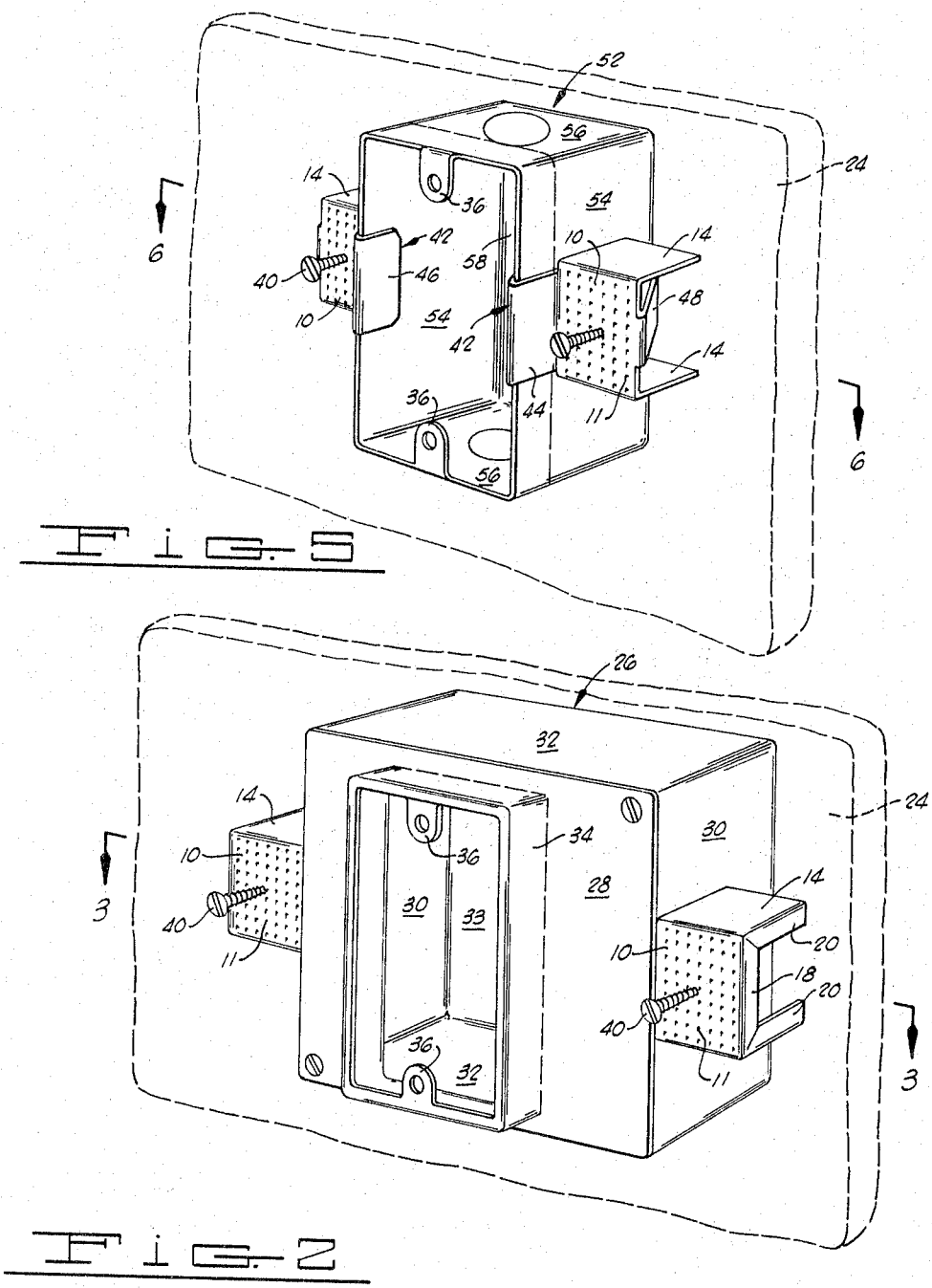

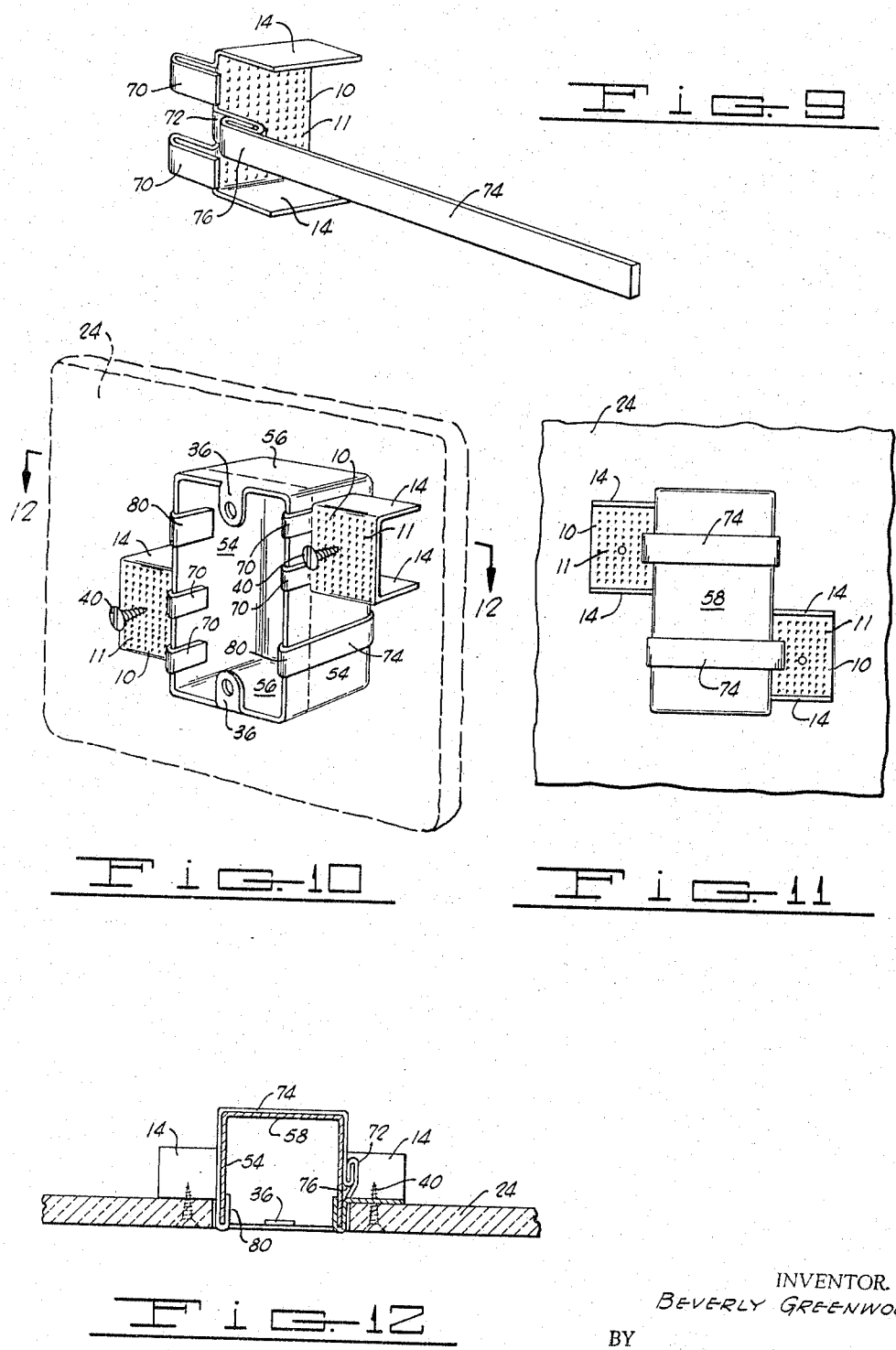

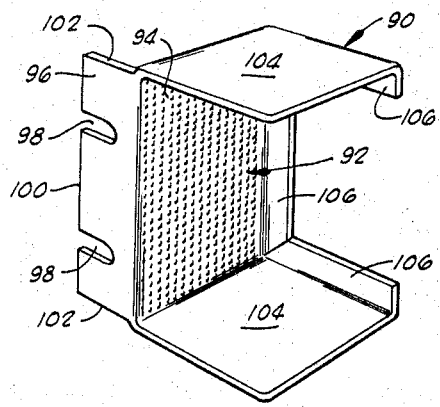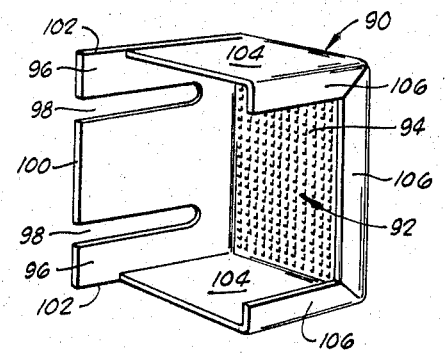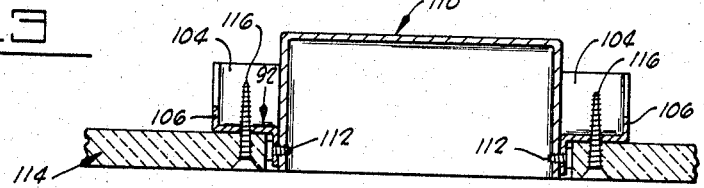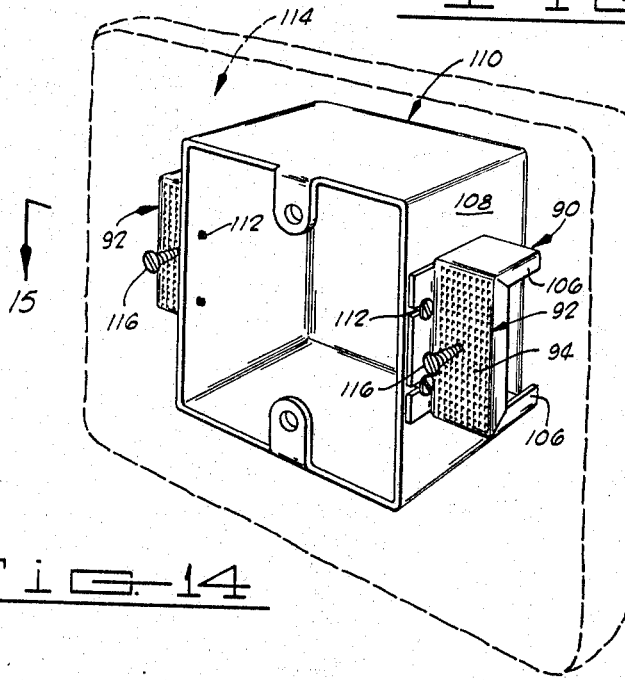

United States Patent Office 3,315,924
Patented Apr. 25, 1967

3,315,924
ASSEMBLY FOR MOUNTING ELECTRICAL FITTINGS IN NEW WALL AND CEILING CONSTRUCTION
Beverly Greenwood, P.O. Box 755,
Oklahoma City, Okla. 73101
Filed June 1, 1965, Ser. No. 465,242
7 Claims. (Cl. 248—27)

This application is a continuation-in-part of my U.S. application Serial Number 434,373, filed February 23, 1965, and entitled "Assembly for Mounting Electrical Fittings in New Wall and Ceiling Construction," now abandoned.

This invention relates to apparatus for securing electrical outlets, jacks or sockets in a fixed location on so-called dry walls and ceilings, as well as on plaster walls, of the type used in building construction. More specifically, but not by way of limitation, this invention relates to a novel bracket which can be used for adjustably mounting electrical conduit boxes and outlets at any desired location on horizontal or vertical walls used in new construction.

In the new construction of buildings, a number of openings must be formed in the walls, and occasionally, in the floors or ceilings of such buildings, to facilitate mounting in selected locations, electrical conduit boxes or outlets to permit electrical service to be made available at certain locations throughout the building under construction. Various means for mounting such conduit boxes have been proposed in the past, and in many of these, particularly in the case of existing construction where access to the rear or inner surface of the wall is not available, the boxes have been provided with ears or flanges which abut the exposed or outer surface of the wall and permit securement to the wall by the use of screws. Other types of boxes which are primarily designed for use in new construction where the rear or inner face of the wall is accessible do not provide such ears or flanges, but are mounted by some form of securement to the rear surface of the wall. Generally, this has been accomplished, as required by electrical codes, by anchoring the conduit box or outlet to a horizontal or vertical structural member forming a rigid support for the box and interconnecting the various upright and vertical members to which the wall panel is secured. Thus, for example, in sheetrock construction, it has been necessary to extend elongated horizontal or vertical rods or channel members between the supporting upright to which the sheetrock is secured in order to provide a mounting for the electrical conduit boxes meeting the specifications of electrical codes. This has engendered much inconvenience in mounting the boxes due to the fact that the precise location of the sheetrock upright channel supports is frequently not finally determined or fixed until the time when the sheetrock is to be placed in position and the wall completed. The installation of the electrical conduit box can therefore not be made until the sheetrock has been finally placed in position and the permanent position of the supporting channels established.

The present invention comprises an assembly for more expeditiously and accurately mounting electrical outlets, switch and conduit boxes and the like in a wall, floor or ceiling under construction. The mounting assembly is adjustable and provides a firm permanent support for the electrical conduit box at a desired location in the wall. The extension of channels, rods or other elongated supporting members between horizontal or vertical uprights used in the wall construction is not required, and the amount of structural material needed for mounting the conduit box is minimized. Substantially any size electrical conduit box can be mounted on so-called dry wall construction, or on plaster walls, while in the process of construction by the use of the present invention.

Broadly described, but without being limited specifically thereto, the present invention comprises a novel mounting bracket having a monoplanar screw engaging face, a box engaging projection extending generally perpendicularly to said screw engaging face, and at least one brace flange extending from said screw engaging face and occupying a plane extending substantially normal to said box engaging projection and spaced therefrom to permit one wall of an electrical box to be positioned between said box engaging projection and said brace flange.

In a preferred embodiment of the invention, the box engaging projection and brace flange each extend at a right angle to the screw engaging face and are spaced from each other by a distance which corresponds, or is equal to, the thickness of the wall of the electrical box which is positioned therebetween.

In a modified embodiment of the mounting bracket which is specially adapted to retain in proper position in a wall a smooth walled electrical box having no plaster ring or other retaining ring, a flexible strap is extended from the screw engaging face in the same direction as the brace flange and is of a length to pass behind the electrical box when the box and mounting bracket are properly positioned in the wall. The flexible strap may be provided with notches or serrations along a portion of its length. The modified mounting brackets as thus described are used in pairs with one bracket being placed on each side of the box and the straps crossed behind the box and either secured to each other, or hooked under the front edge of the box.

In all forms and modifications of the mounting bracket of the invention, it is preferred that the screw engaging face of the bracket be dimpled or indented over at least a portion of its areal extent in order to provide a guide or index for screws, nails or other retaining fasteners which are passed through the wall on which the brackets and its electrical box are mounted into the screw engaging face. While brackets having only a single screw-receiving dimple formed in the screw engaging face provide some advantage over the smooth, non-dimpled brackets, it is preferred that the major portion of the areal extent of the screw engaging face of the bracket be dimpled.

From the foregoing description of the invention, it will have become apparent that an important object of the present invention is to provide an improved bracket for mounting various types of electrical boxes in walls, ceilings and floors.

Another object of the present invention is to provide a combination assembly for mounting electrical fittings in wall construction, such assembly including in the combination, brackets for securement to the wall, and for engagement with electrical boxes of the type providing conduit terminals or outlets for electrical service.

Another object of the present invention is to provide an economical, mechanically sturdy mounting bracket for supporting electrical conduit outlet boxes and the like in new wall construction.

An additional object of the present invention is to provide brackets for mounting electrical boxes in walls whether such boxes have a retaining plaster ring or similarly functioning element associated therewith or not.

Additional objects and advantages of the invention will become apparent as the following detailed description of the invention is read in conjunction with the accompanying drawings which illustrate two exemplary embodiments of the invention.

In the drawings:

FIGURE 1 is a perspective view illustrating a preferred embodiment of the mounting bracket of the present invention.

FIGURE 2 is a perspective view illustrating the manner in which the embodiment of the mounting bracket of the invention illustrated in FIGURE 1 is used for positioning and securing an electrical conduit box at a desired location in sheetrock wall construction.

FIGURE 3 is a horizontal sectional view taken along line 3—3 of FIGURE 2.

FIGURE 4 is a perspective view of a modified embodiment of the mounting bracket of the present invention, such modified embodiment being adapted for use in mounting electrical boxes which are not provided with plaster rings or similar retaining members for preventing movement of the box through an aperture in the wall in which the box is to be mounted.

FIGURE 5 is a perspective view illustrating the manner in which the modified mounting bracket embodiment illustrated in FIGURE 2 is used to secure an electrical box at a desired location in a wall constructed of sheetrock.

FIGURE 6 is a horizontal sectional view taken along line 6—6 of FIGURE 5.

FIGURE 7 is a side elevation view of the electrical box mounted as shown in FIGURE 5, and using the modified mounting bracket embodiment illustrated in FIGURE 4.

FIGURE 8 is a rear elevational view of the switch box assembly shown in FIGURE 5.

FIGURE 9 is a perspective view illustrating yet another modified embodiment of the invention.

FIGURE 10 is a perspective view illustrating the manner in which the modified embodiment shown in FIGURE 9 is used to secure an electrical box at a desired location on a wall.

FIGURE 11 is a rear elevational view of the switch box assembly shown in FIGURE 10.

FIGURE 12 is a sectional view taken along line 12—12 of FIGURE 10.

FIGURE 13 is a perspective view illustrating yet another modified embodiment of the invention.

FIGURE 14 is a perspective view illustrating the manner in which the modified embodiment shown in FIGURE 13 is used to secure an electrical box to a wall.

FIGURE 15 is a sectional view taken along line 15—15 on FIGURE 14.

FIGURE 16 is a perspective view of another modified embodiment of the invention.

Referring now to the drawings in detail, and particularly to FIGURE 1, the embodiment of the mounting bracket of the invention there illustrated includes a substantially monoplanar screw engaging face 10 which is adapted to abut flatly against the rear surface of the wall, floor or ceiling upon which an electrical box of the type used for providing access to electrical conduits or wiring is to be mounted. The screw engaging face 10 is provided with at least one, or preferably a plurality, of dimples 11 which are indented in the surface of the screw engaging face which is to abut the wall.

Extending from the opposite side of the screw engaging face which is to flatly abut the wall or other surface to which the electrical box is to be mounted is a box engaging projection 12. In the illustrated embodiment, the box engaging projection 12 is generally rectangular in configuration and extends normal to the monoplanar screw engaging face 10. The function of the box engaging projection 12 is to pass through an aperture in the electrical box and hook around or engage one wall of the box in a manner hereinafter to be described.

Extending rearwardly from the monoplanar screw engaging face 10 in generally the same direction as the box engaging projection 12 are a pair of brace flanges 14. The brace flanges 14 are each provided with an edge 16 which is positioned to abut flatly against the side wall of an electrical box which is engaged by the box engaging projection 12. The function of the brace flanges 14 is to brace the screw engaging face 10 against the biasing force of a screw, nail or other securing or fastening device, and to prevent the screw engaging face from moving away from the rear surface of the wall to which the electrical box is to be mounted. Although the brace flanges 14 are illustrated in a generally rectangular form, and are shown as coextensive in length with the screw engaging face 10, other forms of brace flanges can be utilized, such as a triangular or trapezoidal form, provided the edges 16 are relatively long and are extended in a direction to permit them to abut flatly against the wall of the electrical box when the screw engaging face 10 abuts flatly against the sheetrock or other wall construction material to which the box is to be mounted.

The final elements of the embodiment of the invention illustrated in FIGURE 1 are end flanges 18 and 20 which extend substantially normal to, and are secured to, the screw engaging face 10 and the brace flanges 14, respectively. The end flanges 18 and 20 function to impart a greater mechanical strength to the mounting brackets, and further can be more easily made a part of the bracket during the process of fabrication than they can be eliminated therefrom. It should be pointed out, however, that their presence is not essential to the adequate and efficient functioning of the mounting bracket.

Although other materials of construction, such as plastic, can be used for fabricating the mounting brackets of the invention, they are preferably constructed of sheet metal.

The manner in which the mounting bracket embodiment illustrated in FIGURE 1 is used in combination with an electrical box for placing the box in a desired location on a wall or the like is best illustrated in FIGURES 2 and 3. In FIGURE 2, a typical wall construction material, such as sheetrock, is outlined in broken or dashed lines, and is designated by reference character 24. The electrical box which is to provide electrical service outlets at that point on the wall 24 is designated generally by reference character 26 and includes a back up plate or plaster ring 28, side walls 30 and top and bottom walls 32 and a back wall 33. The plaster ring 28 is provided with a generally rectangular opening therein which is framed by a projecting aperture liner 34. The aperture liner 34 is a rectangular metallic sleeve which projects into the opening formed in the wall 24 to provide access to the interior of the box 26 from the exposed or front face of the wall. A pair of apertured ears or lugs 36 are provided to permit a face plate 38 to be secured over the terminal connections inside the box.

The manner in which the mounting brackets are used to secure the electrical box 26 in place may be best perceived by referring to FIGURES 2 and 3 conjunctively. In the conventional electrical boxes which are now commercially available, and which provide a plaster ring 28 of the type illustrated in FIGURE 2, apertures are provided at opposed points along the intersection of the side walls 30 with the plaster ring 28 on the opposite sides of the plaster ring. The box engaging projections 12 of two mounting brackets are extended through these apertures so that they bear against the inside surface of the side walls 30 of the switch box (see FIGURE 3). The screw engaging faces 10 of the brackets then substantially extend at right angles to the side walls 30 of the box 26 and are positioned to abut flatly against the rear face of the sheetrock wall 24 when the electrical box is mounted in position. In practice, the mounting brackets will be secured to the electrical box 26 by means of the box engaging projections 12 after the opening has been cut in the sheetrock wall 24 to receive the liner 34 of the electrical box. The opening in the sheetrock wall 24 can be located at any point desired so that there is no limitation placed on the choice of locations for the electrical box by reason of the particular position of structural members in the wall construction.

With the mounting brackets located in the illustrated positions relative to the box 26, the brace flanges 14 of each of the brackets bear against the outer surface of the side walls 30 of the box 26 and prevent the screw engaging faces 10 from being moved away from the inner surface of the wall 24 as the screws, nails or other securing fittings are passed through the wall into the screw engaging faces. In other words, as the screws 40 are screwed into the wall 24 and bear against the screw engaging faces 10, the inward pressure of the screws cannot force these faces away from the wall since the bracing flanges 14 transmit all of the biasing force of the screw to the unyielding side walls 30 of the electrical box 26. The presence of the dimples 11 in the screw engaging faces 10 of the mounting brackets further aids in the process of securing the brackets to the wall with the screws 40 in that the tip of the respective screw is indexed or guided by one of the dimples as it enters the screw engaging face and must enter the screw engaging face at that point. Stated differently, the tips of the screws 40 are not permitted to skew or slide sideways on the screw engaging faces 10 by reason of the presence therein of the dimples 11.

A modified embodiment of the invention is illustrated in FIGURES 4 through 8 of the drawings. Since the modified embodiment of the invention includes many parts identical in form and function to corresponding parts of the embodiment illustrated in FIGURES 1 through 3, like reference numerals have been utilized to identify identical portions of the structure.

In referring to FIGURE 4, it will be perceived that the modified mounting bracket there illustrated includes a dimpled screw engaging face 10 having a plurality of dimples 11 formed therein as described as characteristic of the mounting bracket embodiment illustrated in FIGURE 1. The modified mounting bracket also is characterized in having a pair of brace flanges 14 extending substantially normal thereto. A box engaging projection is also provided, but is of a different configuration and functions slightly differently from the box engaging projections 12 used in the FIGURE 1 embodiment. The box engaging projection shown in FIGURE 4 has thus been designated generally by reference character 42 and is of a generally U-shaped cross-sectional configuration. Thus, the box engaging projection 42 includes a first leg 44 which extends substantially normal to the screw engaging face 10 and in a direction opposite to the direction of extension of the brace flanges 14. The box engaging projection 42 further includes a second leg 46 which extends substantially parallel to, and is spaced from, the leg 44 and connected thereto through a bight on the web portion 47.

As a final element of the modified mounting bracket illustrated in FIGURE 4, an elongated flexible strap 48 extends from the opposite edge of the screw engaging face 10 from that from which the box engaging projection 42 extends and occupies a plane extending substantially normal to the plane occupied by the brace flanges 14. The elongated flexible strap 48 is of a length sufficient to cross behind the electrical box which is to be mounted with the brackets as hereinafter explained. A plurality of notches or serrations 50 are provided in one longitudinal edge of the elongated flexible strap 48 for a purpose also hereinafter to be explained.

The modified mounting brackets of FIGURE 4 are specifically adapted for mounting an electrical box which is not provided with a plaster ring or other retaining flange member of the type depicted in FIGURE 2 and designated by reference numeral 28. Electrical boxes of this type have no structure to prevent their being passed completely through the opening formed in the wall to receive them, and therefore require a modified form of mounting bracket to support them properly on the wall. The manner in which the modified mounting bracket is utilized to mount electrical boxes of this type in a wall is best illustrated in FIGURES 5 through 8.

As illustrated in FIGURE 5, an electrical box of the type described is designated by reference character 52 and includes side walls 54, top and bottom walls 56 and a back wall 58. The dimensions of the box are such, and the dimensions of the opening formed in the wall 24 to receive the electrical box 52 are such, that the side walls 54 and top and bottom walls 56 extend into the opening in a relatively close fit as illustrated in FIGURE 6. There is sufficient clearance, however, to permit the box engaging projections 42 to be hooked over the side walls 54 by passing the leg 44 of the projection between the box and the wall 24 as illustrated in FIGURE 6. With the electrical box 52 thus engaged by the box engaging projections 42, the screw engaging faces 10 abut flatly against the rear face of the wall 24. The brace flanges 14 are also abutted against the side walls 54 of the electrical box 52 and function to retain the screw engaging faces 10 in their proper positions as hereinbefore described. The screws 40 can then be extended through the sheetrock 24 into the screw engaging faces 10 and will penetrate these faces without difficulty due to the presence of the dimples 11 therein. After the electrical box has been secured in the desired location by the use of the modified mounting brackets, the elongated flexible straps 48 are extended across the back 58 of the electrical box 52 and are engaged or interconnected by the use of the serrations 50. In other words, the serrations 50 permit an interlocking arrangement to be achieved so that the electrical box 52 cannot be pushed out of its aperture in the sheetrock 24 by pushing it to the rear. The interlock of the serrated elongated flexible straps 48 is best illustrated in FIGURE 8.

Yet a further modified embodiment of the invention is illustrated in FIGURES 9 through 12 of the drawings. Like the embodiment illustrated in FIGURES 4 through 8, this embodiment is specifically adapted for mounting an electrical box in a wall or the like when the box is not provided with a plaster ring or other retaining flange member to prevent the box from being moved freely through the opening in the wall.

The embodiment of the bracket illustrated in FIGURE 9 includes the dimpled screw engaging face 10 having a plurality of dimples or indentations 11 formed therein and a pair of brace flanges 14 extending substantially normal thereto. Duel box engaging projections 70 similar in shape to the box engaging projections 48 in the FIGURE 4 embodiment form a part of the bracket illustrated in FIGURE 9. A strap engaging hook 72 extends from the screw engaging face 10 in the same general direction as the brace flanges 14 and away from the box engaging projections 70, and is generally U-shaped similarly to the box engaging projections. An elongated flexible strap 74 is provided with a U-shaped hook 76 on one end thereof which will engage or interlock with the strap engaging hook 72.

The use of the embodiment of the bracket shown in FIGURE 9 for mounting an electrical box on a wall is illustrated in FIGURES 10 through 12. A pair of the brackets are secured to the opposite side walls 54 of the electrical box by hooking the box engaging projections 70 over the side walls. The hook-shaped end portion 76 of the strap 74 is then interlocked or engaged with the strap engaging hook 72 on the bracket, and the respective elongated flexible straps 74 are then extended completely around the electrical box and bent into a hook-shaped end portion 80 around the opposite side wall 54 of the box so as to clamp the bracket firmly in place. The two brackets on opposite sides of the electrical box are vertically staggered as illustrated in FIGURES 10 and 11 to avoid interference between the flexible straps 74 as they are passed around the box.

The embodiment of the invention illustrated in FIGURES 9 through 12 has the advantage of permitting the brackets and straps to be more easily made up, more compactly stored for shipment and, in some instances, more securely engaged to the electrical box than can be realized using the serrated or notched strap type of brackets illustrated in FIGURES 4 through 8.

Referring to the modified embodiment of the invention shown in FIGURES 13, 14 and 15, the mounting bracket 90 there shown includes a monoplanar screw engaging face 92 having a plurality of dimples 94 formed therein, and a box engaging projection 96 extending forwardly therefrom at substantially a right angle. The box engaging projection 96 is provided with a plurality of rearwardly extending slots 98 which extend from the forward edge 100 of the box engaging projection toward the screw engaging face 92 over approximately two-thirds of the transverse width of the box engaging projection. The box engaging projection 96 preferably is formed as a rectangular flange having upper and lower side edges 102 extending in line with the upper and lower edges of the screw engaging face 92.

Extending rearwardly at substantially a right angle from the screw engaging face 92 are a pair of spaced brace flanges 104. End flanges 106 are secured to the opposed edges of the brace flanges 104 and to the interconnecting side edge of the screw engaging face 92. In the use of the mounting bracket 90 shown in FIGURE 13, the box engaging projection 96 is abutted flatly against the side of an electrical outlet box designated by 110 in FIGURES 14 and 15 so that the slots 98 formed in the box engaging projection 96 register with screw holes or openings formed in the sides 108 of the electrical outlet box 110. Suitable screws 112 are then passed through the slots 98 in the box engaging projection 96 and the registering holes formed in the sides 108 of the electrical outlet box 110 to secure the brackets 90 in position on the sides of the electrical outlet box.

It will be perceived that, with the brackets 90 mounted in the described position, the screw engaging faces 92 thereof are set rearwardly from the forward edge of the electrical outlet box 110 so that a portion of the side walls 108 of the outlet box can project through the opening formed in the material of construction of the wall designated generally by reference charcater 114. With the brackets 90 in this position on each side of the electrical outlet box 110, screws 116 can then be passed through the wall 114 into the screw engaging faces 92 where they are prevented from slipping or canting on the screw engaging face by contact with one of the dimples 94 formed therein. In this way, the screw engaging faces 92 are drawn into abutting contact with the rear side of the wall 114 and function to limit the forward movement of the electrical outlet box 110 into the opening in the wall. The box is thus secured firmly at the desired position on the wall.

The embodiment of the mounting bracket illustrated in FIGURE 16 is quite similar to the embodiment illustrated in FIGURE 13, the primary difference being that box engaging projection 98 is turned rearwardly instead of forwardly from the screw engaging face 92 and extends in the same direction as the brace flanges 104. The bracket is used similarly to the FIGURE 15 bracket in mounting an electrical box on a wall.

It should be pointed out that both of the mounting bracket embodiments depicted in FIGURES 13–16 have the advantage of being adjustable in their positions on the side of the electrical outlet boxes to which they are attached, thus permitting the boxes to be mounted in walls of varying thickness as a result of the ability to vary the spacing of the screw-engaging face 92 from the front of the box.

From the foregoing description, it will be perceived that the present invention provides a simple structure which facilitates rapid and accurate installation of various types of electrical boxes in any location on a wall, floor or ceiling which may be desired. No dependence upon the location of vertical or horizontal wall structural members is involved in the use of the invention, and the apertures for the accommodation of the electrical boxes can be located at substantially any place desired. The mounting brackets provide a structurally strong support for the electrical boxes which is characterized by a long and trouble-free service life, and the mounting brackets of the invention can be used by one possessing relatively little skill in the art. Substantially any shape of electrical switch box can be mounted using the brackets of the invention, and though generally rectangular boxes have been illustrated herein by way of example, the brackets can also be utilized for mounting round boxes or boxes of any other shape which may be provided.

The brackets are preferably constructed of sheet or strap metal, but it is not intended to preclude by identifying such preferred construction, the possibility of the use of certain types of plastic or other relatively rigid materials of the requisite structural strength to accomplish the functions of the brackets which have been described herein.

Although certain exemplary embodiments of the invention have been described in considerable detail in order to permit one skilled in the art and authorized to do so to practice the invention, it is contemplated that various functional equivalents of the structure herein described and depicted in the drawings can be evolved without the exercise of inventive faculty by those possessing a reasonable level of skill in the electrical arts. All such equivalent structures, insofar as they rely upon the basic principles herein disclosed, are intended to be circumscribed by the spirit and scope of this invention, except as the same may be necessarily limited by the appended claims or reasonable equivalents thereof.

I claim:
1. A mounting bracket for mounting an electrical box on walls, floors, and ceilings, comprising:
 a monoplanar screw engaging face;
 a box engaging projection extending generally normal to said screw engaging face;
 at least one brace flange extending from said screw engaging face and occupying a plane extending substantially normal to said box engaging projection and spaced therefrom to permit one wall of the electrical box to be positioned between said box engaging projection and said brace flange; and
 an elongated flexible strap extending from the screw engaging face in the same direction as said brace flange and having a plurality of notches therein along a portion of its length.

2. A mounting bracket as claimed in claim 1 wherein said box engaging projection is generally U-shaped in cross-sectional configuration and includes
 a first leg extending from said screw engaging face in the direction opposite the direction of extension therefrom of said brace flange, and
 a second leg extending parallel to said first leg and connected thereto by a web portion spaced from said screw engaging face.

3. An assembly for receiving electrical conduits and providing electrical service at a desired location in a monoplanar structural panel comprising:
 an electrical box having opposed side wall portions; and a back wall extending between said side wall portions;
 a pair of opposed mounting brackets each positioned adjacent, and detachably connected to, one of the opposed side wall portions of said electrical box, said mounting brackets each comprising;
 a dimpled, monoplanar screw engaging face extending generally perpendicular to the respective side wall portion of said box for screw engagement to one surface of said monoplanar structural panel;
 a generally rectangular box engaging projection extending generally normal to said screw engaging face and passing into said box and bearing against the inside surface of the respective side wall portion;

a pair of generally rectangular parallel brace flanges extending from said screw engaging face in a direction normal thereto and contacting the respective side portion of said electrical box; and an elongated, flexible strap extending from said screw engaging face around said box to at least the center of the back wall of said box, said strap having notches formed therein along a portion of its length, which portion is distally located with respect to said screw engaging face;

the flexible straps of said opposed mounting brackets being connected to each other across the back wall of said box by interlocking of said notches.

4. A mounting bracket for mounting an electrical box on walls, floors and ceilings comprising:

a monoplanar screw engaging face;

a box engaging projection of U-shaped cross-section and including a first leg extending from said screw engaging face in a direction substantially normal thereto; and a second leg extending parallel to said first leg and connected thereto by a web portion spaced from said screw engaging face;

at least one brace flange extending from said screw engaging face and occupying a plane extending substantially normal to said box engaging projection and spaced therefrom to permit one wall of the electrical box to be positioned between said box engaging projection of said brace flange;

a strap engaging hook of generally U-shaped cross-section extending from said screw engaging face in the opposite direction from said box engaging projection; and an elongated flexible strap having a hook-shaped end portion detachably connected to said strap engaging hook.

5. An assembly for receiving electrical conduits and providing electrical service at a desired location on walls, floors, ceilings or the like, said assembly comprising:

an electrical box having at least two side wall portions and having a back wall extending between and connecting said wall portions; and a pair of mounting brackets positioned adjacent said opposed side wall portions of the electrical box for securing said electrical box in said desired location and each including:

a monoplanar screw engaging face extending substantially normal to said side wall portions;

a box engaging projection extending generally normal to said screw engaging face and passing around one edge of the respective side wall portion and up inside said electrical box parallel to, and in abutting contact with, the respective side wall portion;

brace means extending from said screw engaging face to the respective side wall portion of said electrical box for preventing movement of said screw engaging face toward said side wall portion and out of perpendicular alignment with said box engaging projection; and an elongated flexible strap, the straps of said pair of brackets extending across the back wall of said electrical box, and said assembly being further characterized to include means for engaging said flexible straps with each other opposite the back wall of said box.

6. A mounting bracket for mounting an electrical box on walls and ceilings, comprising:

a monoplanar screw engaging face having concave dimples over a major portion of its entire area and disposed substantially in justaposition to each other to facilitate the engagement of a screw with said screw engaging face;

a box engaging projection extending normal to said screw engaging face and adapted to be extended through a slot in an electrical box to prevent movement of said box toward or away from the wall or ceiling in which it is mounted; and a pair of spaced brace flanges attached to said screw engaging face and extending substantially parallel to each other and substantially normal to the plane occupied by said screw engaging face, said brace flanges extending from said screw engaging face in the direction of formation of the concavity of each of said dimples.

7. An electrical service assembly for providing access to electrical power through a sheet rock construction panel or the like, said assembly comprising:

an electrical box having a pair of opposed parallel side walls and a back wall connecting the side walls, the side walls each having a slot therein;

at least one mounting bracket for mounting said electrical box on walls and ceilings constructed of said panels, said mounting bracket comprising:

a monoplanar screw engaging face having concave dimples over a major portion of its entire area and disposed substantially in juxtaposition to each other to facilitate the engagement of a screw with said screw engaging face;

a box engaging projection extending normal to said screw engaging face and extending through said slot in the adjacent side wall of said electrical box for preventing movement of said box toward or away from the wall or ceiling panel in which it is mounted; and a pair of spaced brace flanges attached to said screw engaging face and extending substantially parallel to each other and substantially normal to the plane occupied by the screw engaging face, said brace flanges extending from said screw engaging face in the direction of formtaion of the concavity of each of said dimples and bearing against an adjacent side wall of said electrical box.

References Cited by the Examiner

UNITED STATES PATENTS

| | | | |
|---|---|---|---|
| 1,066,706 | 7/1913 | Caine | 220—3.4 |
| 1,719,741 | 7/1929 | Winning | 248—27 |
| 1,898,282 | 2/1933 | Almcrantz | 220—3.8 |
| 2,143,278 | 1/1939 | Myers | 220—3.92 |
| 2,452,645 | 11/1948 | Firsel | 5—207 |
| 2,753,141 | 7/1956 | Weber | 248—27 |

FOREIGN PATENTS 730,452  5/1955  Great Britain.

CLAUDE A. LE ROY, Primary Examiner.

J. F. FOSS, Assistant Examiner.